(12) United States Patent
Wong et al.

(10) Patent No.: US 10,368,677 B2
(45) Date of Patent: Aug. 6, 2019

(54) CULINARY PRESS

(71) Applicant: DanDre Technology Innovation Limited, Wanchai (HK)

(72) Inventors: Shu Yen Wong, Hong Kong (HK); Andre Ludwig, Sheung Shui (HK)

(73) Assignee: DanDre Technology Innovation Limited, Wanchai (HK)

( * ) Notice: Subject to any disclaimer, the term of this patent is extended or adjusted under 35 U.S.C. 154(b) by 364 days.

(21) Appl. No.: 15/417,666

(22) Filed: Jan. 27, 2017

(65) Prior Publication Data

US 2018/0213962 A1 Aug. 2, 2018

(51) Int. Cl.
*A47J 19/06* (2006.01)

(52) U.S. Cl.
CPC ..................... *A47J 19/06* (2013.01)

(58) Field of Classification Search
CPC ........ A47J 19/02; A47J 19/022; A47J 19/023; A47J 19/06; A47J 19/005; A47J 43/04; A47J 43/286; A47J 44/00; A47J 2043/04481; A47J 2043/0449; B30B 9/02; B30B 9/04; B30B 9/06; B30B 15/08; A23N 1/00; A23N 1/02; A23L 2/04

See application file for complete search history.

(56) References Cited

U.S. PATENT DOCUMENTS

| 6,974,098 B2 | 12/2005 | Keller |
| 9,101,240 B2 * | 8/2015 | Lee .......................... A47J 19/06 |

| 2004/0061010 A1 | 4/2004 | Keller |
| 2014/0020573 A1 | 1/2014 | Lee et al. |
| 2016/0220056 A1 | 8/2016 | Wong |
| 2018/0303266 A1 * | 10/2018 | Obregon Salorio .... A47J 19/02 |

FOREIGN PATENT DOCUMENTS

| GB | 2288114 | 10/1995 |
| GB | 2355921 | 5/2001 |

OTHER PUBLICATIONS

Everten, Love to Cook, Dreamfarm Garject—garlic press scrape eject, Sep. 4, 2011, https://www.youtube.com/watch?v=qBBy1mCHbh4 (Year: 2011).*
VacuVinFan, Garlic Press, Sep. 23, 2014, https://www.youtube.com/watch?v=2deslgFa8TM (Year: 2014).*

* cited by examiner

*Primary Examiner* — Matthew Katcoff
(74) *Attorney, Agent, or Firm* — Heslin Rothenberg Farley & Mesiti P.C.; Kristian E. Ziegler; Melvin S. Li

(57) ABSTRACT

The present disclosure provides an elongate culinary press. The press has a receptacle for accommodating foodstuff to be processed, a pressing member for moving towards or away from the receptacle, a pair of handle members extending from the receptacle and the pressing member, respectively, a scraping member for scraping processed foodstuff away from the receptacle, and a transmission mechanism. The press is adapted to assume a first configuration in which the arms are spread apart, the receptacle is exposed to receive foodstuff and the scraper is disposed in one end of the receptacle, and assume a second configuration in which the arms are moved towards each other, the pressing member is pressed against the foodstuff in the receptacle, and the scraping member is moved from one end to the opposite end of the receptacle.

13 Claims, 10 Drawing Sheets

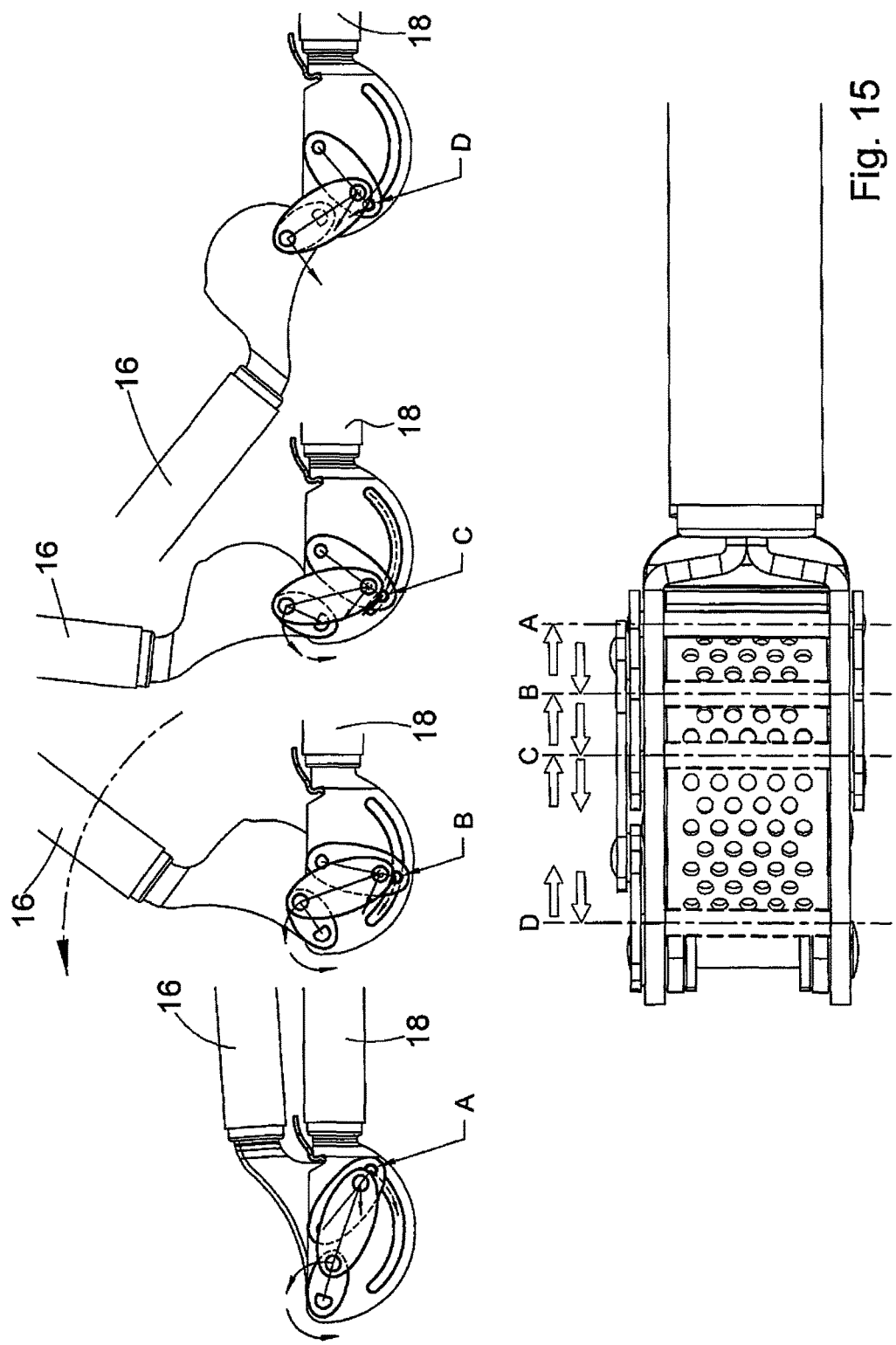

CULINARY PRESS

FIELD OF THE INVENTION

The present invention is concerned with an improved culinary process, and in particular but not limited to a self-scrapable culinary press.

BACKGROUND OF THE INVENTION

There are a variety of culinary presses in the market. While they are generally effective to some extent for processing or pressing foodstuff, e.g. garlics, such different presses tend to focus on addressing different issues. For example, some presses aim at allowing a user be able to use a lesser amount of force in a food pressing task, while some presses tend to achieve a more effective foodstuff crushing effect.

One problem with many conventional culinary presses in the market is that after pressing the pressed foodstuff either remains in a foodstuff receptacle and/or adhered to an outer surface of the receptacle. When this arises, a user would need to use a separately tool, e.g. a knife or spoon, to remove the pressed and adhered foodstuff away. In a commercial kitchen, a cook may be too busy to salvage the adhered the pressed and adhered foodstuff, causing wastage. This is undesirable.

There have been proposals to include a built-in scraper to a culinary press so that after a pressing exercise a user can then use the built-in scraper to remove the pressed and adhered foodstuff. However, this is still undesirable especially in a fast-paced commercial kitchen. This is because speed and convenience of foodstuff preparation is of paramount concern in such a commercial kitchen. The requirement of having to firstly press foodstuff and then secondly to remove the foodstuff with such a built-in scraper can considerably hinder the speed of preparing foodstuff thus time taken of serving meals to restaurant customers.

The present invention seeks to address the above issues, or at least to provide a useful alternative to the public.

SUMMARY OF THE INVENTION

According to a first aspect of the present invention, there is provided a culinary press comprising an elongate body including a pressing portion and a handle portion arranged at opposite ends thereof; the pressing portion having:
  a) a receptacle made of surroundings walls and a perforated plate defining the bottom of the receptacle;
  b) a pressing member; and
  c) a scraping member disposed adjacent the perforated member; and
the handle portion having a first handle member and a second handle member extending from the pressing member and the receptacle, respectively;
  wherein:
  i) the pressing member is pivotably connected to the receptacle for pressing against foodstuff accommodated in the receptacle through the perforated member;
  ii) the scraping member is disposed adjacent or against an outwardly facing surface of the receptacle, extending across the receptacle, and movable between a proximal end and a distal end of the receptacle; and
  iii) the press further comprises a transmission mechanism configured to transfer moment of force from the first handle member to both the receptacle and the scraping member simultaneously.

With this configuration, the action of pressing foodstuff automatically generates the action of removing pressed foodstuff occurs at the same time. Since the removal of the pressed foodstuff occurs simultaneously, a user can combine two tasks into one in an intuitively manner.

Preferably, the pressing member may be pivotably connected to the receptacle at a first pivot, the first pivot defining a first axis extending across the receptacle, and the perforated member may be pivotably connected to and movable with respect to the receptacle at the first pivot. For example, there is provided a pin which connects the pressing member and the receptacle defining the first axis.

Suitably, the scraping member may take the form of a rod defining a second axis.

Advantageously, the press may comprise a first leg and a second leg disposed at opposite lateral sides of the receptacle, an upper end of the legs pivotably connected to an upper region of the receptacle at a third pivot defining a third axis, and a lower end of the legs connected to opposite ends of the rod, respectively, whereby movement of the rod is effected by the first and second legs.

In an embodiment, the transmission mechanism may be disposed at one lateral side of the receptacle.

In one embodiment, the transmission mechanism may include a first actuation arm pivotably connected to the receptacle at the first pivot and fixedly connected to (and with respect to) the pressing member, wherein the transmission mechanism may be configured whereby movement of force is transferrable from the pressing member to the first actuation arm, and thus movement of the first arm mirrors movement of the pressing member.

Suitably, the transmission mechanism may include a second actuation arm connected to the first actuation arm whereby movement of force is transferrable from the pressing member to the second actuation arm via the first actuation arm.

Advantageously, the second actuation arm may be connected to the first leg whereby movement of force is transferred from the pressing member to the first leg via the first actuation arm and the second actuation arm.

In an embodiment, the receptacle may be provided with a guide extending from the proximal end to the distal end, and the scraping member may be reciprocatingly movable in the guide.

In one embodiment, the guide may be disposed adjacent the perforated plate.

Preferably, the guide may take the form of a pair form of grooves disposed at opposite sides of the receptacle.

Suitably, the grooves may be configured to an arch shape conforming to the curvature of the perforated member.

Advantageously, the pressing member may be provided with an outwardly facing pressing surface with a substantial convex surface, and the receptacle is provided with an inwardly facing surface, the inwardly facing surface having a concave surface with a curvature complementary to the convex pressing surface. The use of this configuration in the pressing member and the receptacle enhances the mechanical advantage and thus effectiveness of foodstuff pressing and thus ease of use.

According to a second aspect of the present invention, there is provided an elongate culinary press comprising a receptacle for accommodating foodstuff to be processed, a pressing member for moving towards or away from the receptacle, a pair of handle members extending from the receptacle and the pressing member, respectively, a scraping member for scraping processed foodstuff away from the receptacle, and a transmission mechanism, wherein the press is adapted to assume a first configuration in which the arms are spread apart, the receptacle is exposed to receive foodstuff and the scraper is disposed in one end of the receptacle, and a second configuration in which the arms are moved towards each other, the pressing member is pressed against the foodstuff in the receptacle, and the scraping member is moved from one end to the opposite end of the receptacle, wherein when the press assuming the second configuration from the first configuration both movement of the pressing member towards the receptacle and movement of the scraping member are simultaneously caused by one action of squeezing of the arms together.

Preferably, the press may be configured such that movement of the scraping member is effected in response to movement of the pressing member.

Suitably, the receptacle may include surrounding walls and perforated member defining a bottom of the receptacle.

Advantageously, the pressing member, the receptacle and the perforated member are connected together at a first pivot defining a first axis, whereby moment of force is transferrable from the pressing member to the foodstuff in the receptacle for crushing.

In an embodiment, the transmission mechanism may connect the first pivot and the scraping member for transferring moment of force from the pressing member to movement of the scraping member for movement thereof.

In one embodiment, the pressing member is provided with a convex pressing surface, and the receptacle is provided with a concave surface with a curvature complementary to the pressing surface.

In a specific embodiment, the pressing member and the first handle member together may have an elongate profile and define a first longitudinal axis, the receptacle and the second handle member together may have an elongate profile and define a second longitudinal axis, and the elongate first actuation arm may define a third longitudinal axis, wherein in the first configuration both the first and third longitudinal axes generally extending in the same orientation, and in the second configuration both the second and third longitudinal axes generally extending in the same orientation.

According to a third aspect of the present invention, there is provided an elongate culinary press comprising a receptacle, a pressing member for moving towards or away from the receptacle, a pair of handle members extending from the receptacle and the pressing member, respectively, a scraping member for scraping processed foodstuff away from the receptacle, wherein the receptacle includes surrounding walls and a perforated plate which together define a cavity for accommodating foodstuff to be processed, the perforated plate pivotably movable with respect to the surrounding walls, wherein the press is adapted to assume a first configuration in which the arms are spread apart, the performed plate secured between the surrounding walls thus forming the cavity for receiving foodstuff, and the scraper is disposed in one end of the receptacle, a second configuration in which the arms are moved towards each other, the pressing member is pressed against the foodstuff in the receptacle, and the scraping member is moved from the one end to the opposite end of the receptacle for removing pressed foodstuff adhered to the perforated member, or a third configuration in which the arms are spread apart beyond an extent of the first configuration causing the perforated member be lifted away from the surrounding walls for cleaning, wherein during the press assuming the second configuration from the first configuration both movement of the pressing member towards the receptacle and movement of the scraping member are simultaneously caused by one action of squeezing of the arms together.

BRIEF DESCRIPTION OF DRAWINGS

Some embodiments of the present invention will now be explained, with reference to the accompanied drawings, in which:

FIG. 15 is a schematic diagram showing a connection and hinge mechanism and its operation during pressing-and-scraping exercise.

DETAILED DESCRIPTION OF PREFERRED EMBODIMENTS OF THE INVENTION

Figure 1:
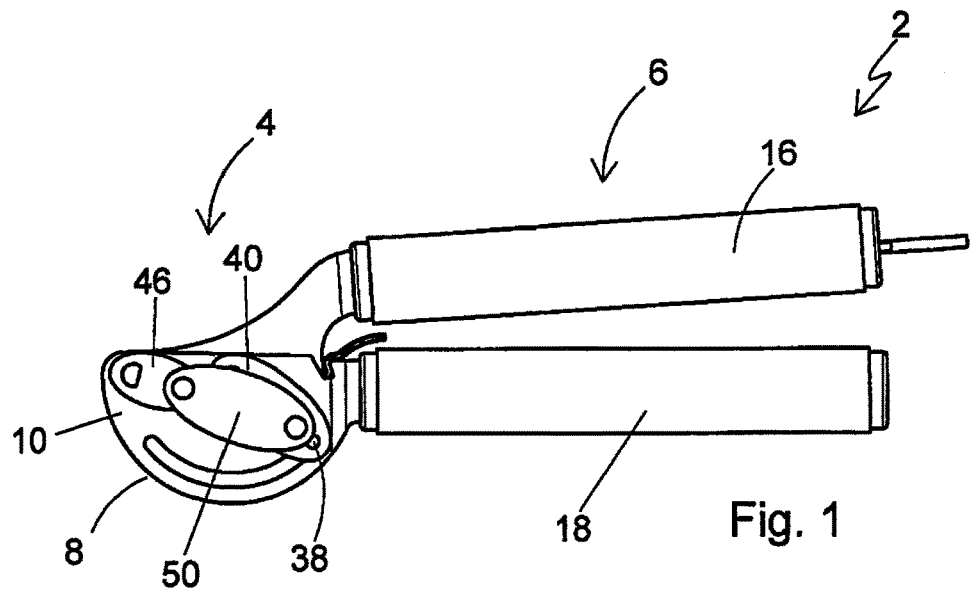
FIG. 1 and FIG. 3 are opposite side views of an embodiment of a culinary press according to the present invention.
Figure 2:
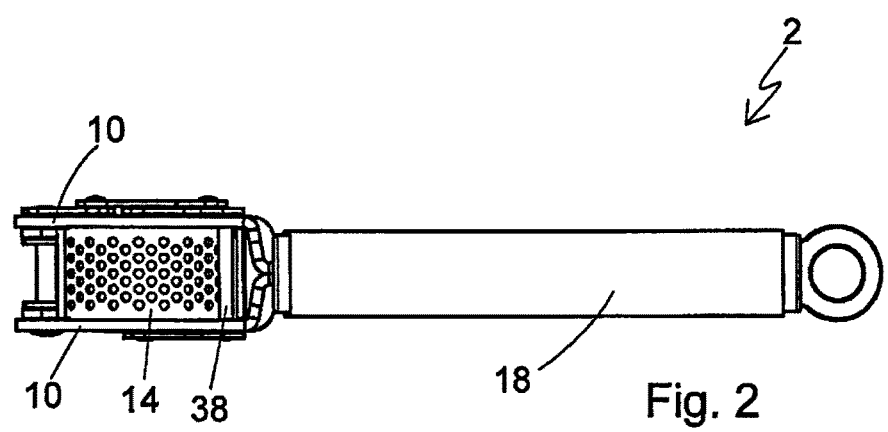
FIG. 2 is a bottom view of the press of FIG. 1.
Figure 3:
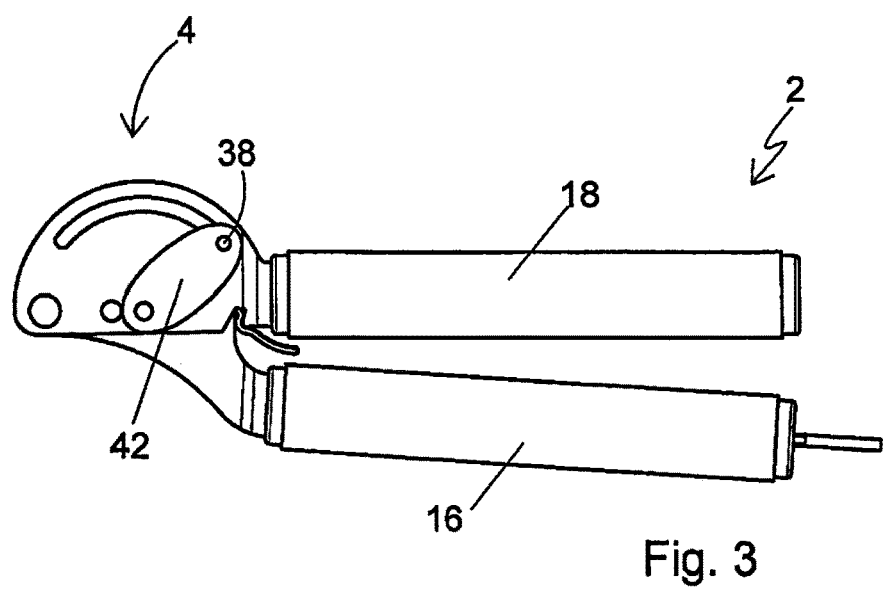
Figure 4:
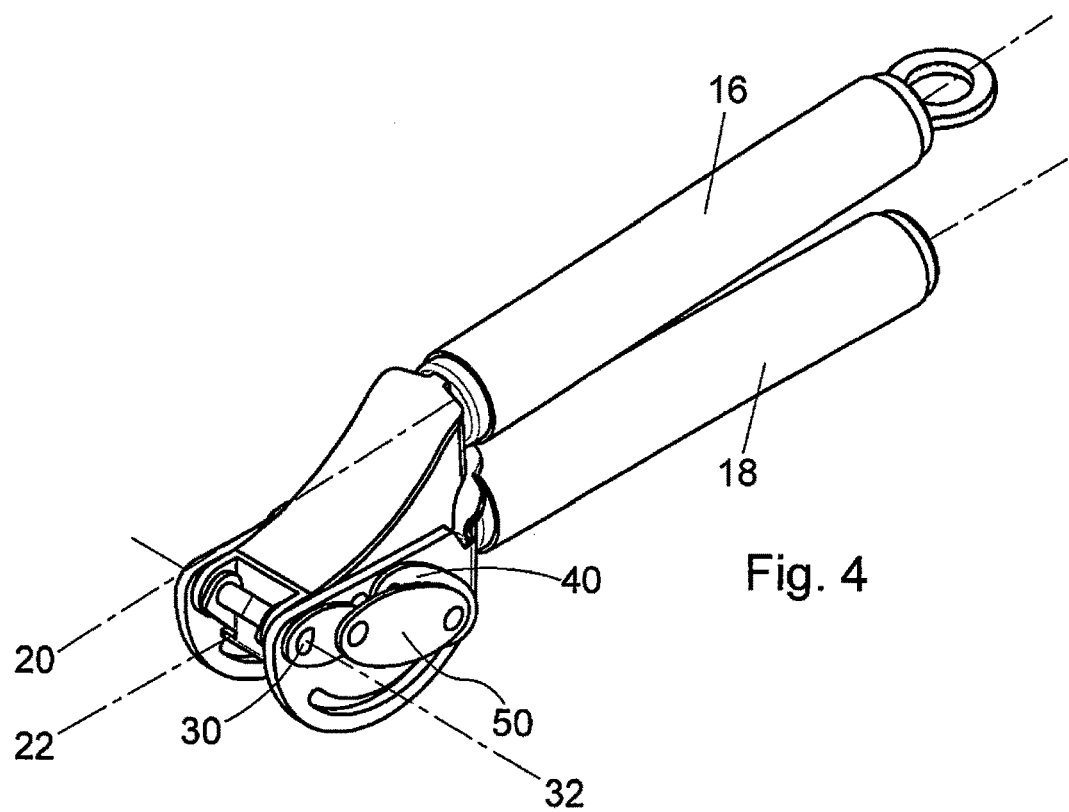
FIG. 4 and FIG. 5 are two different perspective views showing opposite sides of the press of FIGS. 1 and 2.
Figure 5:
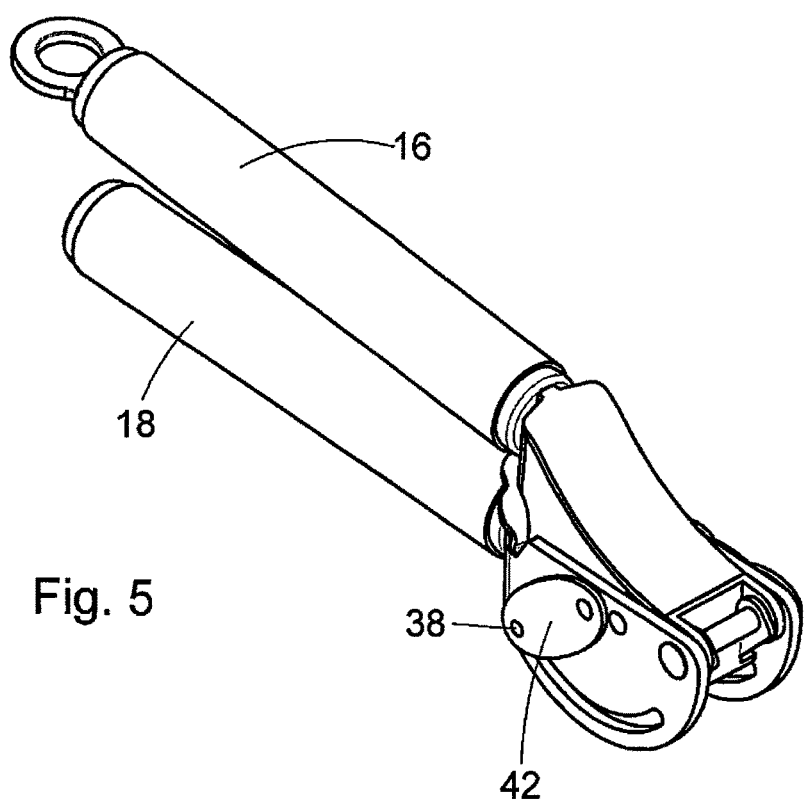

The present invention is concerned with a culinary press such as a garlic press. FIGS. 1 to 10 generally illustrate an embodiment of a culinary press according to the invention, and is designated 2. FIGS. 11-14 generally illustrate the working and operation of the press 2.

Firstly referring to FIGS. 1-6 and 10, the press 2 is provided with a pressing portion 4 and a handle portion 6 at opposite ends of the press. The pressing portion 4 comprises a pressing member 7 (or plunger) and a foodstuff receptacle 8 defined by surrounding walls 10 and a perforated member 12. In this embodiment, the perforated member 12 takes the form of a perforated plate generally defining the bottom 14 of the receptacle 8. The surrounding walls and the perforated member 12 together define a cavity in which foodstuff to be processed resides. Please see FIGS. 6-7 in particular.

FIGS. 1-6 illustrate the press 2 in a first configuration in which the pressing member 7 is fully received in the receptacle 8.

The press 2 comprises a first handle member 16 and a second handle member 18 extending from the pressing member 7 and the receptacle 8, respectively. The pressing member 7 and the first handle member 16, and the receptacle 8 and the second handle member 18, generally define a first longitudinal axis 20 and a second longitudinal axis 22, respectively. The perforated member 12 is provided with a flange extending from a rear end thereof and disposed at a junction between the receptacle and the second handle 18 when it sits in the receptacle 12. Please see FIG. 4 in particular.

The pressing member 7 is provided with an outwardly facing pressing surface 24 which has a substantial convex curvature, and the receptacle 8 or an inwardly facing face of the perforated member 12 is provided with a surface 34 towards which the convex pressing surface 24 is movable. The inwardly facing surface 34 has a substantial concave curvature which complimentary to the outwardly facing convex surface. An outwardly facing surface 36 likewise has a substantial convex surface against which the scraping member 38 moves. Please see FIG. 11 in particular.

The pressing member 7 is pivotably connected to the receptacle 8 at a proximal end 28 of the receptacle 8. Specifically, the pressing member 7 is connected to the receptacle 8 at a first pivot 30 defining a first axis 32 extending laterally across the receptacle 8. Please see FIG. 7 in particular.

The perforated member 12 defines, on one side, the inwardly facing surface 34 towards which the pressing member 7 faces in the first configuration, and, on the opposite side, an outwardly facing surface 36. The press 2 comprises a scraping member 38 arranged adjacent the outwardly facing surface 36 of the perforated member 12. In this embodiment, the scraping member 38 takes the form of an elongate rod. The receptacle 8 is provided with a pair of legs, namely a first leg 40 and a second leg 42, disposed at opposite outwardly facing sides of the receptacle 8 and depending from an upper region to a lower region thereof. Upper ends of the legs 40, 42 are pivotably connected to the upper region and lower ends of the legs 40, 42 are connected to the scraping member 38. As clearly shown in FIGS. 2 and 6, the scraping member 38 defines a second axis 44 extending laterally across the receptacle 8. In this embodiment, the laterally extending first axis 32 and second axis 44, and the scraping member 38 are generally parallel to each other. Please see FIG. 10 and FIG. 11 in particular.

The receptacle 8 is provided with a guide depending from a lower region of the surrounding walls. Please see for example FIGS. 1 and 4. The guide defines a track along which the scraping member 38 is movable. In this embodiment, the guide includes a pair of grooves defined by the lower region and depending from the receptacle 8.

Figure 10:
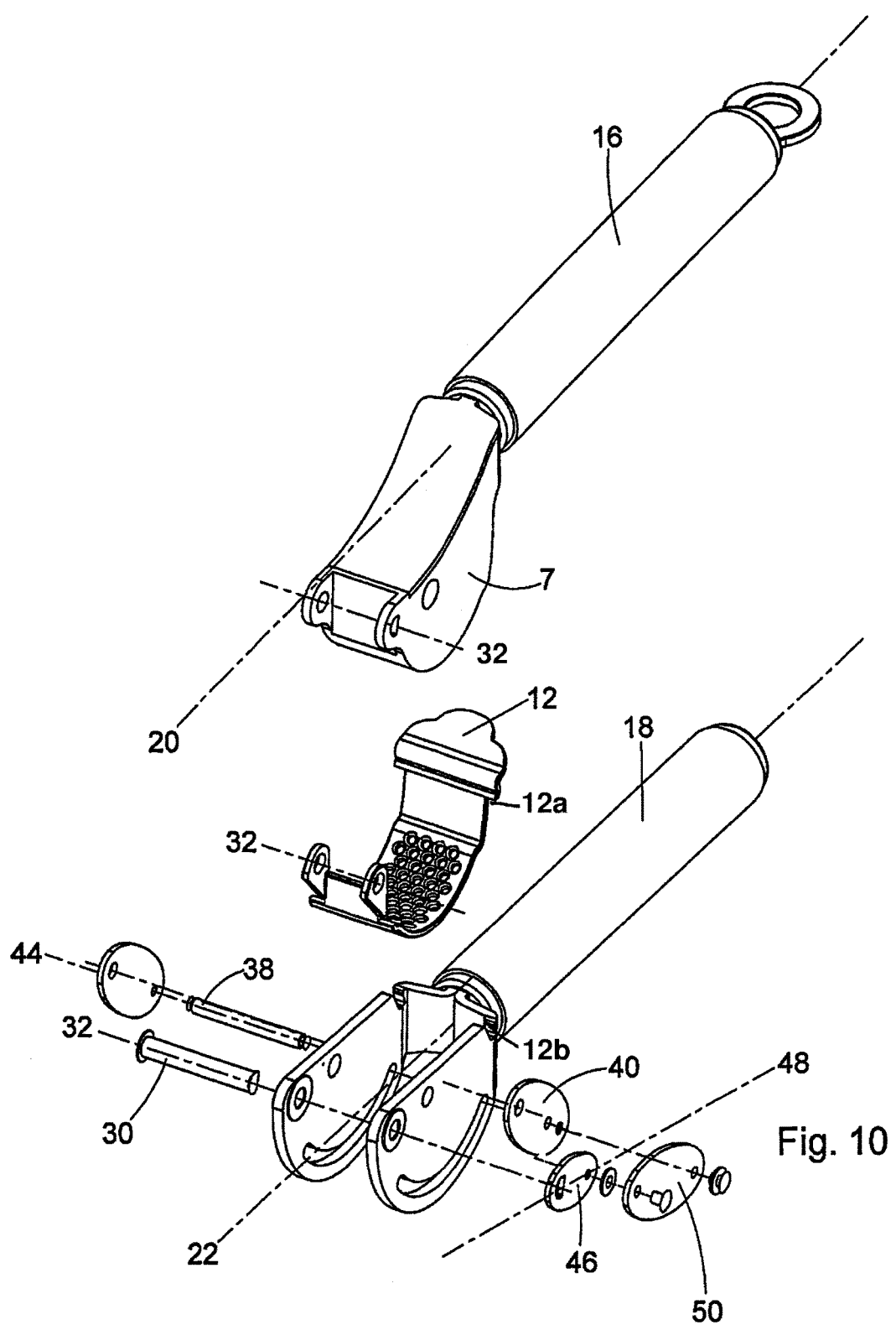
FIG. 10 is an exploded view showing the press but otherwise generally corresponds to FIG. 4.

The press 2 further comprises a transmission mechanism for effecting movement of the pressing member 7 and movement of the scraping member 38 simultaneously. In this embodiment, the transmission mechanism is provided with a first actuation arm 46 which has an elongate profile and defines a third longitudinal axis 48. Referring to FIG. 10, it is shown that the first longitudinal axis 20 and the third longitudinal axis 48 are roughly parallel to each other, or at least generally extending longitudinally in the same orientation.

The transmission mechanism is configured such that while the first actuation arm 46 is pivotably connected to the receptacle 8 and thus rotatably movable with respect to the receptacle 8 at the first axis 32, the first actuation arm 46 moves together with and in response to movement of the first handle member 16 and the pressing member 7. Thus, it is envisaged that moment of force is transferrable from the first handle member 16 and the pressing member 6 to the first actuation arm 46, whereby movement of the first actuation arm 46 mirrors that of the first handle member 16 and the pressing member 6. In this embodiment, this is achieved by providing a cylindrical rivet forming the first pivot but with a cut-out region at an end of the rivet where the first actuation arm 46 engages, and the pressing member fixed connected to the rivet. With this particular configuration of the rivet fitting through both the first actuation arm 46, the pressing member 7 and the first actuation arm move in syn. Alternative embodiments are possible as long as the first actuation arm 46 moves with the pressing member 6.

The transmission mechanism is further provided with a second actuation arm 50, one end of which is pivotably connected to the first actuation arm 46 and the other end is pivotably connected to the first leg 40. Since the first leg 40 is movably connected to the pressing member 6 via the first actuation arm 46 and the second actuation arm 50, moment of force is transferrable from the first handle member 16 and the pressing member 7 to the first actuation arm 46, then to the second actuation arm 50, then to the first leg 40 and the scraping member 46.

As described above, since the scraping member 38 is connected to first and second legs 40, 42, movement of the first handle member 16 is also transferred to movement of the scraping member 38 as pressed foodstuff exits the perforated member 12. It is to be understood that the handle member 16 and the pressing member 12 with respect to the receptacle 8, the pressing member 12 and the first actuation arm 46, the first actuation arm 46 with respect to the second actuation arm 50, and the second actuation arm 50 with respect to the leg 40 and the scraping member 30 form a synchronized lever system, enabling the action of food pressing and pressed food scraping in an one-hand operation and the use of a single tool to achieve two tasks simultaneously.

Figure 7:
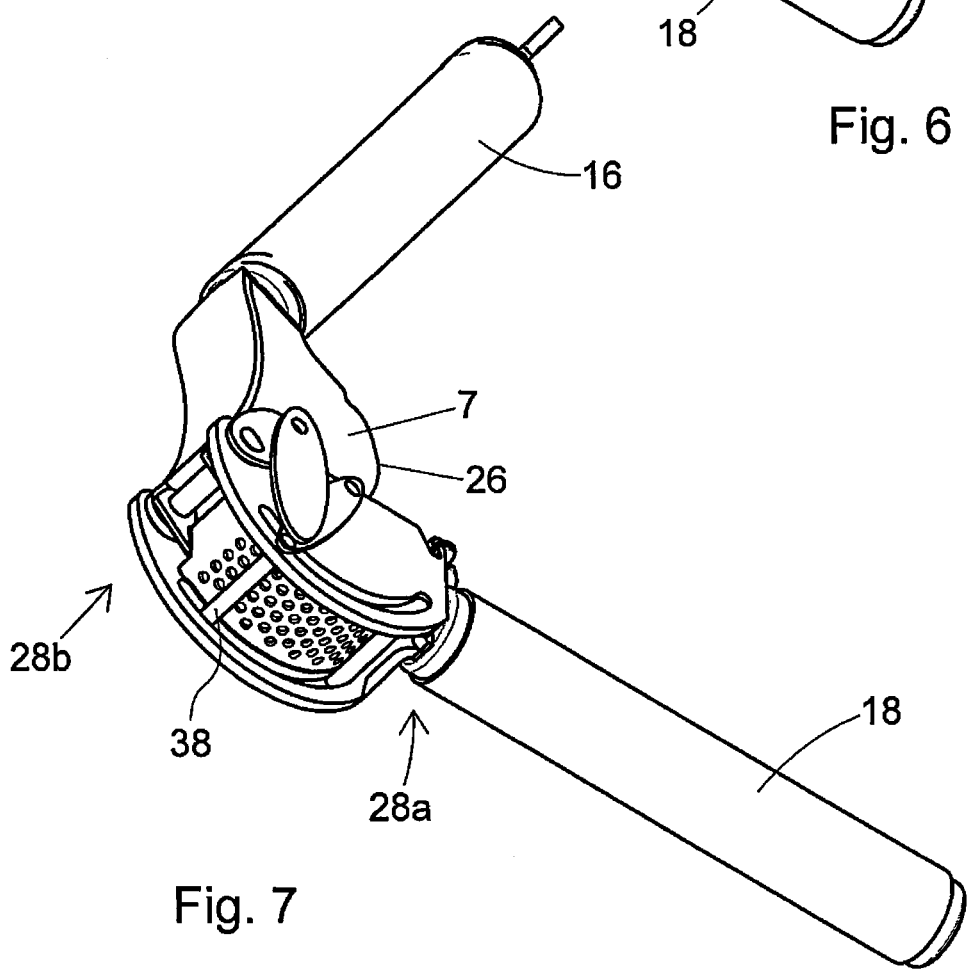

FIG. 7 illustrates the press 2 in which the first handle member 16 and the second handle member 18 are spread apart from each other. From the figure, it is shown that the scraping member 46 is positioned in the guide between distal and proximal ends 28a, 28b of the receptacle 8, although the scraping member 8 is positioned closer to the proximal end 28.

Figure 8:
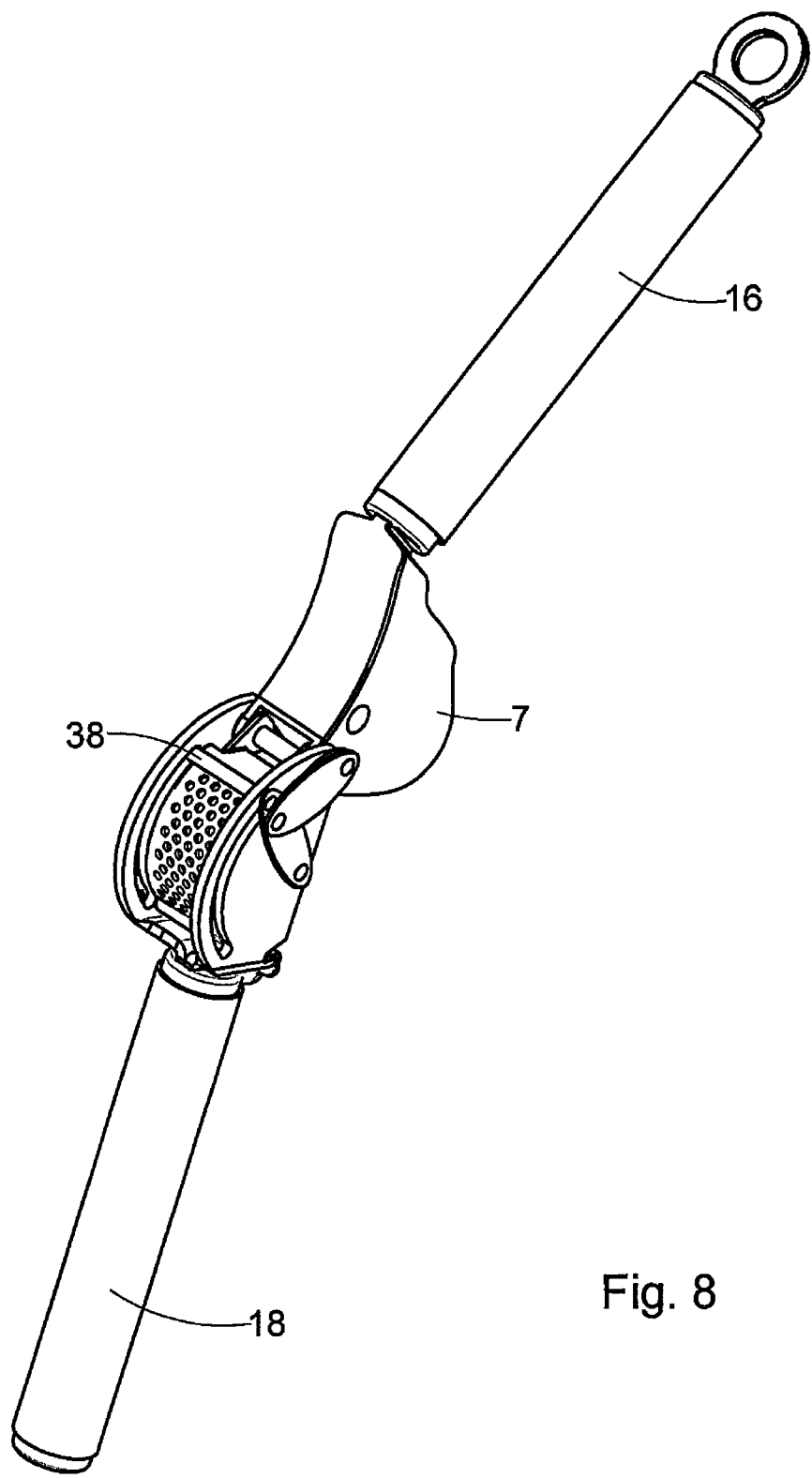

In the first configuration, as shown in FIGS. 1-6, the scraping member is positioned at the distal end 28a of the receptacle 8. FIG. 8 illustrates a second configuration of the press 2 in that the handle members 16, 18 are further spread apart with the scraping member 46 positioned at the proximal end 18.

Figure 9:
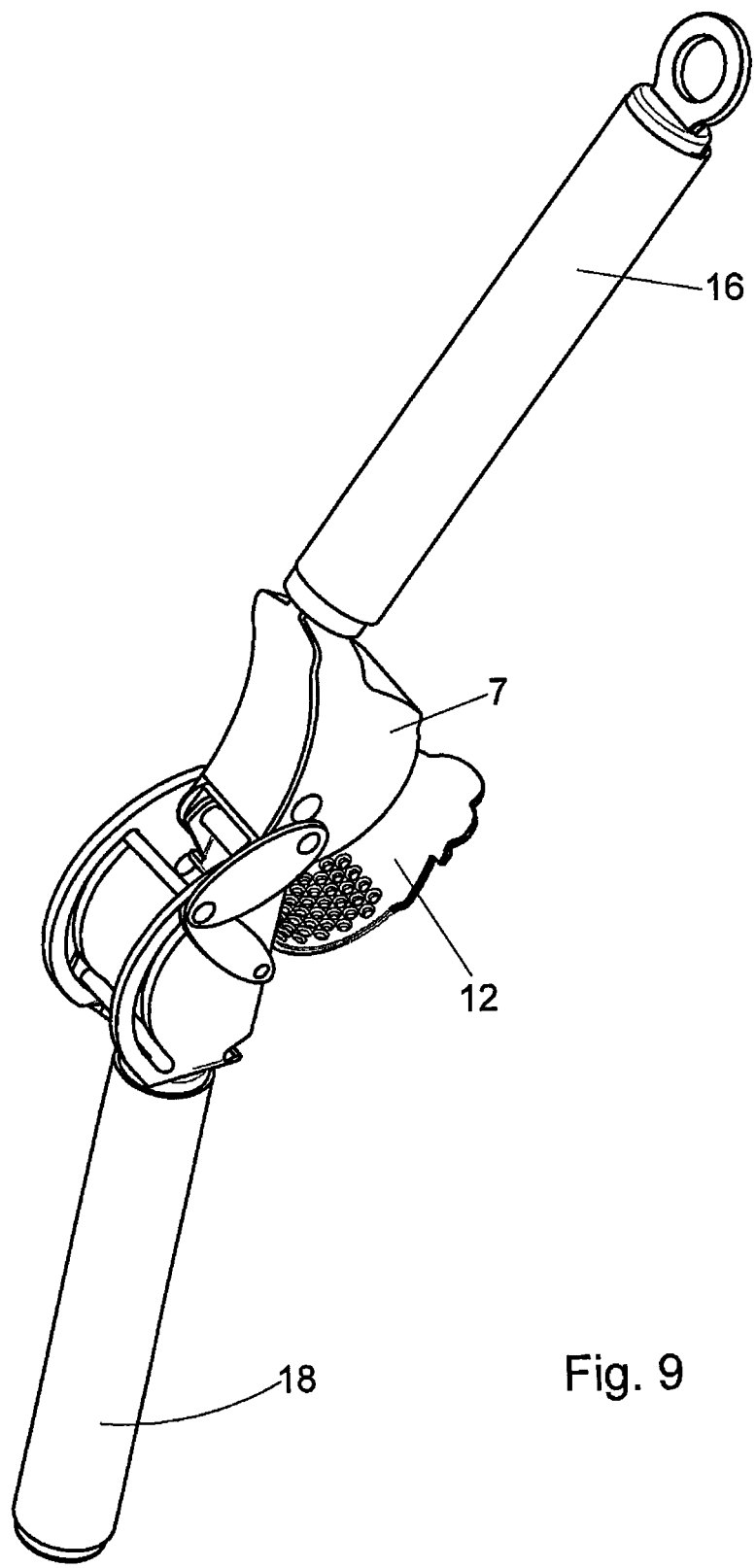
FIG. 9 generally corresponds to FIG. 8 but in FIG. 9 a perforated plate is caused to move from a concealed position to a different, and exposed position.

FIG. 9 provides illustration similar to that of FIG. 8. However, the press 2 shown in FIG. 9 has the perforated member 12 lifted away from the receptacle 8. Nevertheless, the position of the first handle member 16 and the scraping member 46 with respect to the receptacle 8 has not changed.

Figure 11:
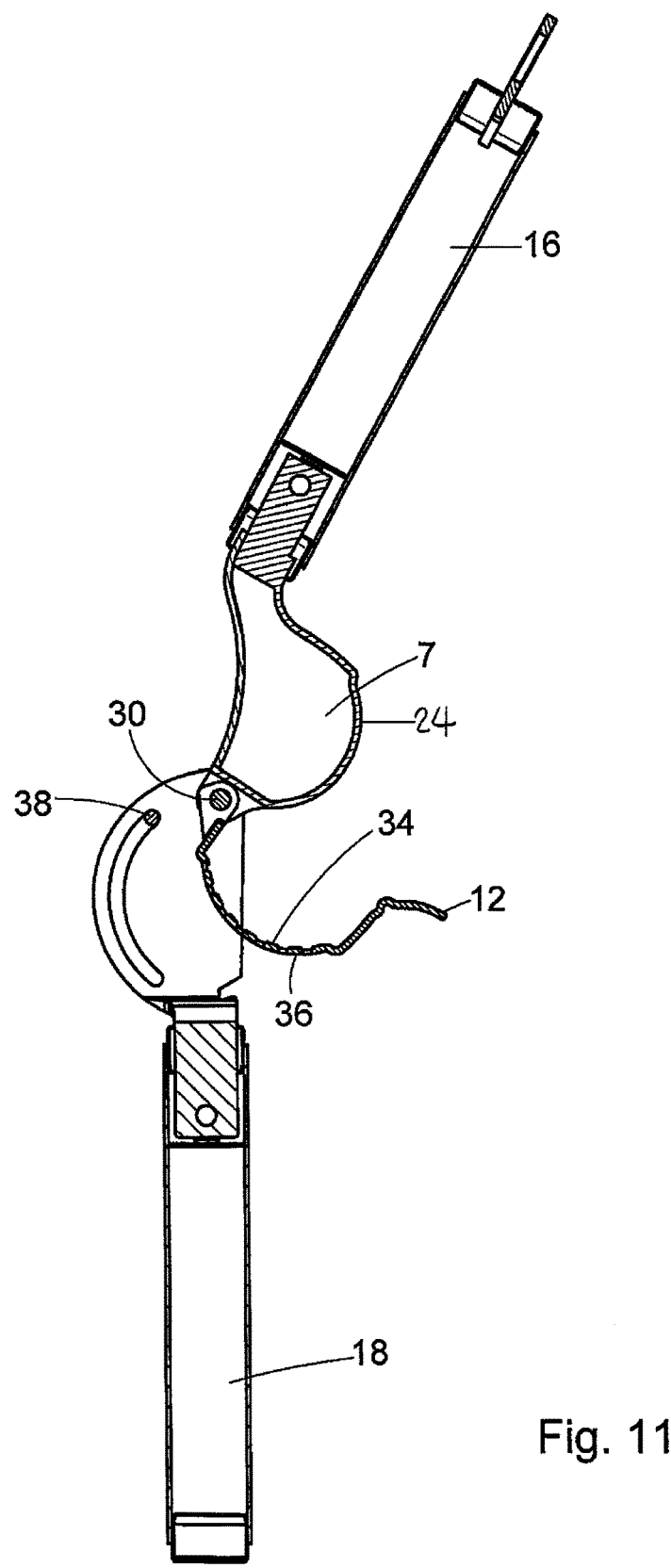
FIG. 11 is a schematic diagram of the press but otherwise corresponds to FIG. 9.

FIG. 11 is a schematic diagram showing the press 2 in the second configuration. FIGS. 9 and 11 together illustrate the capability of the perforated member 12 pivotably movable away from the receptacle 8.

Figure 6:
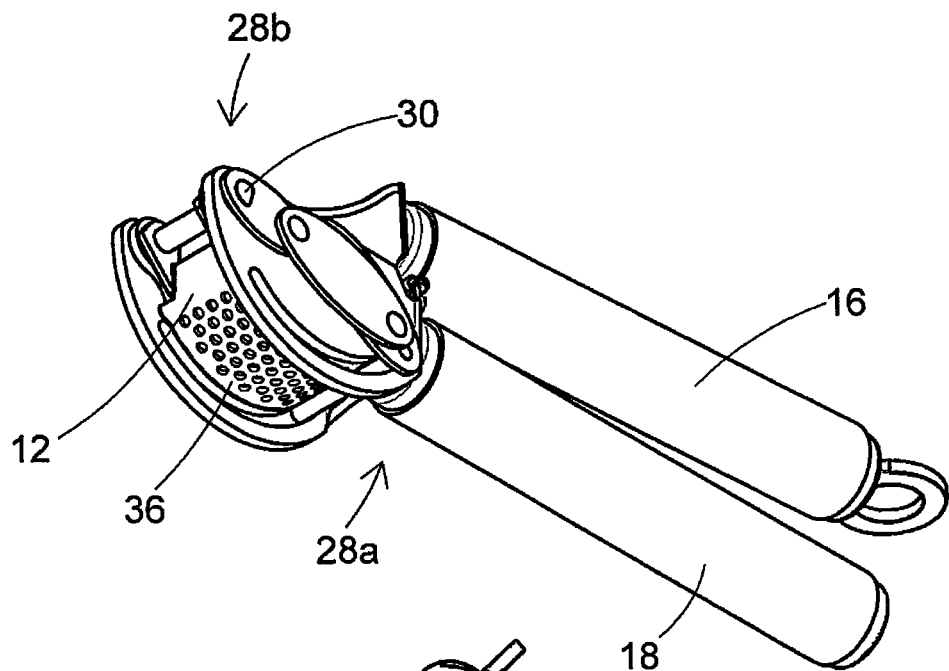
FIG. 6, FIG. 7 and FIG. 8 are three different perspective views showing a bottom side of the press in three different configurations.

In the first configuration as shown in for example FIG. 6, for example during foodstuff is being pressed the perforated member 12 is secured to and sits between the surrounding walls. In the second configuration as shown in FIG. 7 when the arms 16, 18 are spread apart, the perforated member 12 is configured such that it still is secured to and sits between the foodstuff. This is advantageous because after a foodstuff pressing task, the spreading of the arms 16, 18 causes the scraping member 38 to move from the distal end to the proximal end 28b. The perforated member 12 in the secured position allows the scraping member 38 to be able to remove the pressed foodstuff adhered to the perforated member 12. If the perforated member 12 were not the secured position then the scraping member 38 would not be in a proximity to remove the pressed foodstuff.

In this embodiment, the receptacle 8 is configured in that the perforated member 12 is provided with a locking rib 12a protruded from a rear surface thereof and arrange below the flange, and the surrounding walls are provided with a recess 12b. Please see FIG. 10 in particular. Accordingly, with the locking rib 12a and the recess 12b, the perforated member 12 is thus secured snapped fitted against the surrounding walls in the receptacle 8 when the press is in the first or second configuration. In either of these configurations, a sufficient interference fit is formed maintaining the secured position of the perforated member 12, the secured position allowing the scraping member 38 to remove pressed foodstuff away from the outwardly facing convex surface of the perforated member 12. In a third configuration when the arms sufficiently spread part beyond the position shown in FIG. 7 or 8, the perforated member 12 can be lifted up and away from the surrounding walls, overcoming the frictional engagement of the interference fit. In this third configuration, the perforated member 12 is exposed for cleaning, for example.

Figure 12:
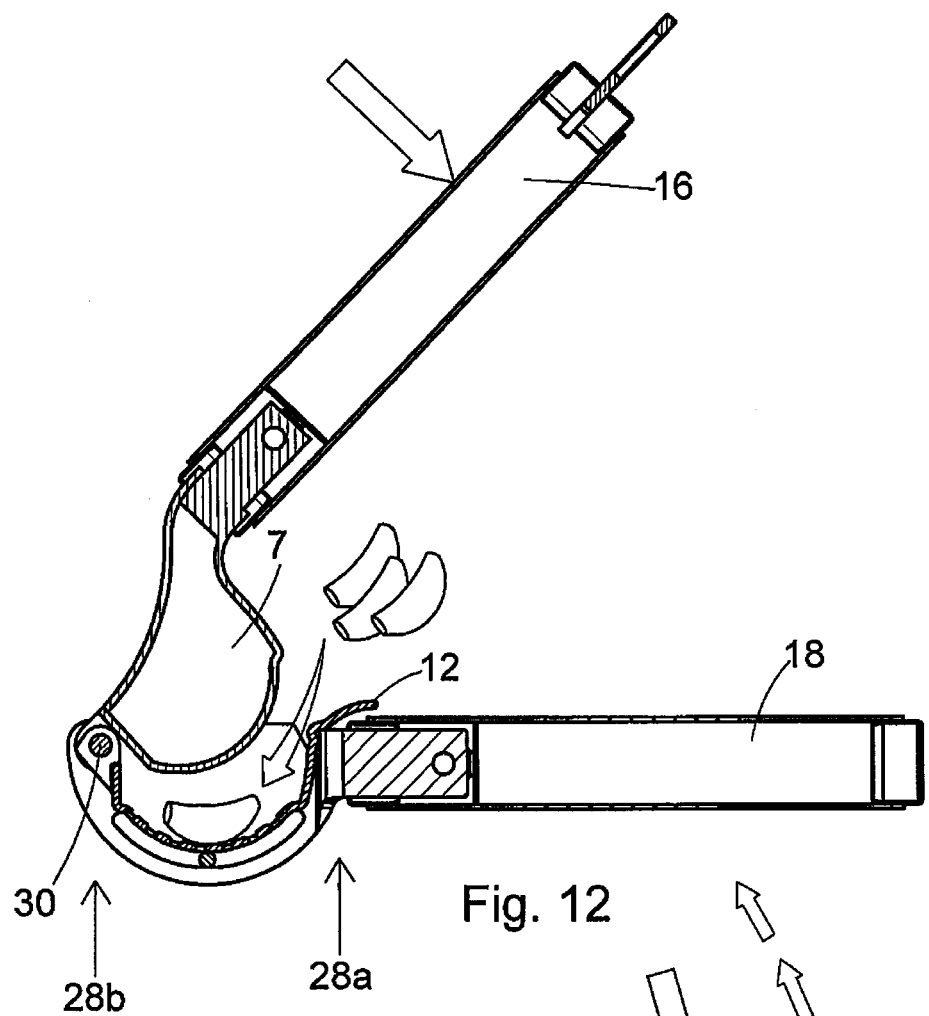
FIG. 12 is a schematic diagram illustrating the operation of the press during in pressing exercise, but otherwise corresponds to FIG. 7.
Figure 13:
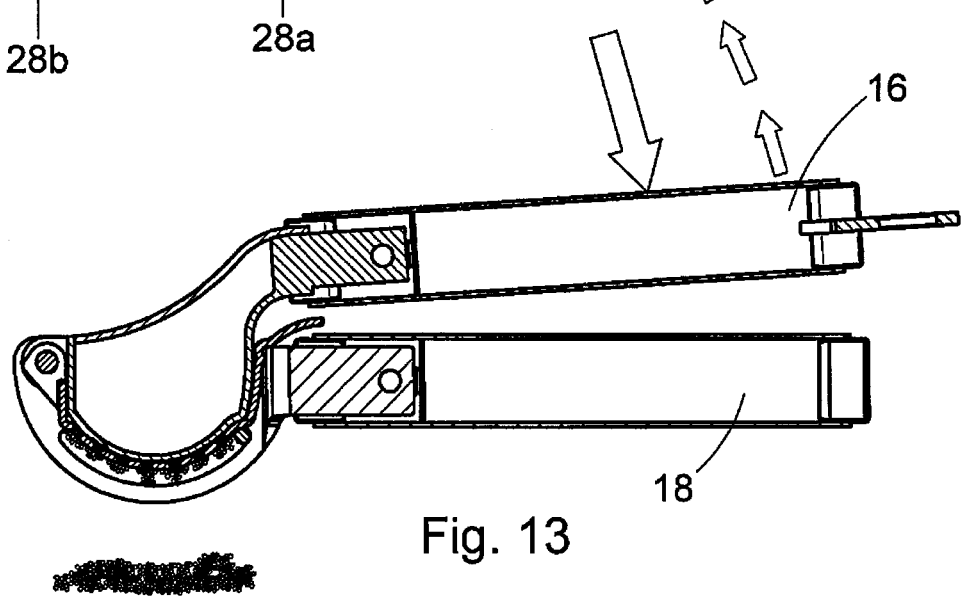
FIG. 13 is a schematic diagram illustrating foodstuff having been pressed, but otherwise corresponds to FIG. 6.
Figure 14:
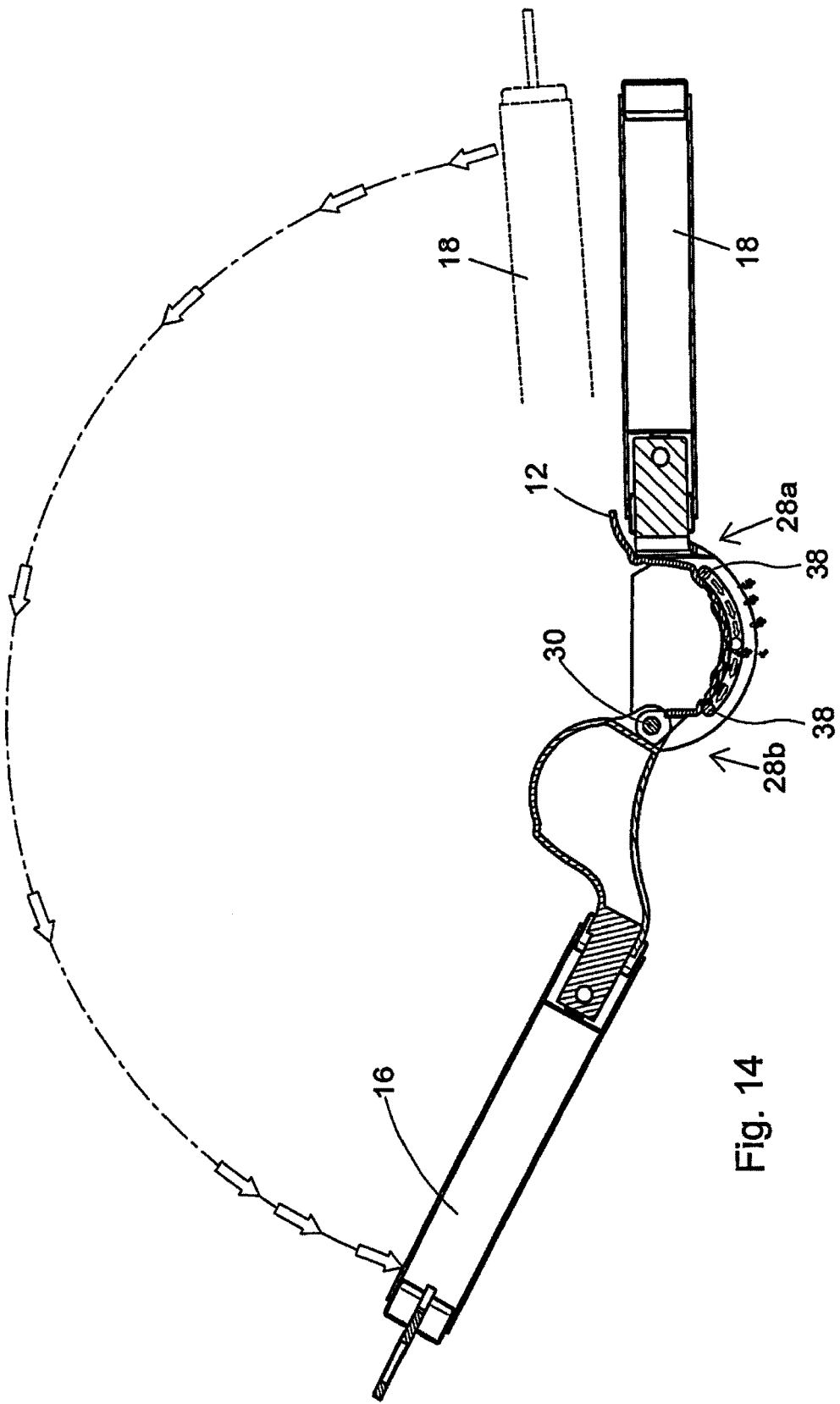
FIG. 14 is a schematic diagram illustrating, after a pressing-and-scraping exercise, the effect of spreading apart of pressing levers.

FIGS. 12-14 are schematic diagrams illustrating the press in use. FIG. 12 shows that the receptacle 8 has received foodstuff to be processed. As the first and second handles 16, 18 are squeezed or otherwise brought together by a single hand of a user, the foodstuff is crushed and pressed through the perforated member 12. Thus, as the scraping member 46 moves along the guide from the proximal end 28b to the distal end 28a of the receptacle 8, the pressed foodstuff is removed from the perforated member 12 at the same time. After an initial treatment of the foodstuff, when the first and second handles 16, 18 are spread apart the scraping member 46 travels from the distal end 28a to the proximal end 28b, performing a further scraping action for removing any residual pressed foodstuff adhered to the perforated member 12. It is envisaged that, in use, when the handles 16, 18 are brought together and apart in a pressing exercise, the scraping member 46 moves in the guide in a reciprocating manner.

FIG. 15 is a schematic diagram showing, in greater detail, different configurations of the press 2 during a pressing exercise. The top left drawing shows the first configuration in which the scraping member 46 is positioned at the distal end 28a, labelled as A. The top right drawing shows the second configuration in which the scraping member 46 is positioned at the proximal end, labelled as position D. The two top drawings in the middle show two other configurations in which the scraping member 46 is positioned between the proximal end 28b and the distal end 28a.

From the above description, it can be envisaged that a press in according to the present invention can effect foodstuff pressing, and removal of pressed foodstuff from the press, simultaneously, or in a one-hand squeezing action of the handle members, efficiently. Further, with the configuration of the pressing member 7 and the perforated member 12 foodstuff can be pressed in a more effective and efficient manner.

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. For example, although in the embodiment(s) depicted above the transmission mechanism includes the first actuation arm and the second actuation arm, alternative configurations of the transmission mechanism for transferring moment of force from the first handle/the pressing member to the receptacle/the scraping member at the same time is within the scope of the present invention. Also, a skilled person in the art will be aware of the prior art which is not explained in the above for brevity purpose.

We claim:

1. A culinary press comprising:
    an elongate body including a pressing portion and a handle portion arranged at opposite ends thereof,
    wherein the pressing portion comprises:
        a) a receptacle made of surroundings walls and a perforated plate defining the bottom of the receptacle;
        b) a pressing member; and
        c) a scraping member disposed adjacent the perforated member; and
    wherein the handle portion comprises a first handle member and a second handle member extending from the pressing member and the receptacle, respectively,
    wherein the pressing member is pivotably connected to the receptacle for pressing against foodstuff accommodated in the receptacle through the perforated member,
    wherein the scraping member is disposed adjacent or against an outwardly facing surface of the receptacle, extending across the receptacle, and movable between a proximal end and a distal end of the receptacle, and
    wherein the press further comprises a transmission mechanism configured to transfer moment of force from the first handle member to both the receptacle and the scraping member simultaneously.

2. The culinary press as claimed in claim 1, wherein the pressing member is pivotably connected to the receptacle at a first pivot, the first pivot defining a first axis extending across the receptacle, and the perforated member is pivotably connected to and movable with respect to the receptacle at the first pivot.

3. The culinary press as claimed in claim 2, wherein the scraping member takes the form of a rod defining a second axis.

4. The culinary press as claimed in claim 3, comprising a first leg and a second leg disposed at opposite lateral sides of the receptacle, an upper end of the legs pivotably connected to an upper region of the receptacle at a third pivot defining a third axis, and a lower end of the legs connected to opposite ends of the rod, respectively, whereby movement of the rod is effected by movement of the first and second legs at the third pivot.

5. The culinary press as claimed in claim 4, wherein the transmission mechanism is disposed at one lateral side of the receptacle.

6. The culinary press as claimed in claim 4, wherein the transmission mechanism includes a first actuation arm pivotably connected to the receptacle at the first pivot and fixedly connected to the pressing member via the first pivot, wherein the transmission mechanism is configured whereby movement of force is transferrable from the pressing member to the first actuation arm, and movement of the first arm mirrors movement of the pressing member.

7. The culinary press as claimed in claim 6, wherein the transmission mechanism includes a second actuation arm connected to the first actuation arm whereby movement of force is transferrable from the pressing member to the second actuation arm via the first actuation arm.

8. The culinary press as claimed in claim 7, wherein the second actuation arm is connected to the first leg whereby movement of force is transferred from the pressing member to the first leg via the first actuation arm and the second actuation arm.

9. The culinary press as claimed in claim 1, wherein the receptacle is provided with a guide extending from the proximal end to the distal end, and the scraping member is reciprocatingly movable in the guide.

10. The culinary press as claimed in claim 9, wherein the guide is disposed adjacent the perforated plate.

11. The culinary press as claimed in claim 9, wherein the guide takes the form of a pair of grooves disposed at opposite sides of the receptacle.

12. The culinary press as claimed in claim 11, wherein the grooves are configured to an arch shape.

13. The culinary press as claimed in claim 1, wherein the pressing member is provided with an outwardly pressing surface with a substantial convex surface, and the receptacle is provided with an inwardly facing surface and an outwardly facing surface, the inwardly facing surface having a concave surface with a curvature complementary to the convex pressing surface.

\* \* \* \* \*